J. B. ADT.
DRYING APPARATUS.
APPLICATION FILED AUG. 24, 1912.

1,057,912.

Patented Apr. 1, 1913.
7 SHEETS—SHEET 3.

WITNESSES
F. B. Worden
Sarah Schotta.

INVENTOR
John B. Adt,
by G. H. & W. J. Howard,
Attorneys

UNITED STATES PATENT OFFICE.

JOHN B. ADT, OF BALTIMORE, MARYLAND, ASSIGNOR TO THE JOHN B. ADT COMPANY, A CORPORATION OF MARYLAND.

DRYING APPARATUS.

1,057,912.   Specification of Letters Patent.   Patented Apr. 1, 1913.

Application filed August 24, 1912. Serial No. 716,791.

*To all whom it may concern:*

Be it known that I, JOHN B. ADT, a citizen of the United States, and resident of Baltimore, Maryland, have invented certain Improvements in Drying Apparatus, of which the following is a specification.

The main object of the present invention is to effect economy in the consumption of fuel in drying operations; and the invention consists principally in peculiar means whereby heated atmospheric air is forced through a rotary cylinder containing the material to be dried, from its rear or delivery end, to the forward or entering end, in order that the drying air will first come into contact with the driest, and pass thence to the wettest portion of the material, thus increasing the effectiveness of the apparatus, not only with respect to the fuel, but also in regard to the time required to perform the drying operation.

It further consists in a novel construction of gangs of steam pipe in the rotary cylinder; and in the manner of arranging certain of the pipes to prevent in the drying operation, clogging of the material as it passes over and under them, as will hereinafter fully appear.

One of the many uses to which my improved drying apparatus is applicable is the drying of grain which has been used in brewing and distilling operations and which contains a large percentage of water, and which for this reason requires the consumption of much fuel, before the moisture contained therein is driven off.

In the further description of the said invention which follows, reference is made to the accompanying drawings, forming a part hereof, and in which.

Referring now to the drawings, 1 is a rotary drum or cylinder provided at its receiving and delivery ends with friction bands 2 and 3 which rest on the supporting rollers 5.

Figure 1:
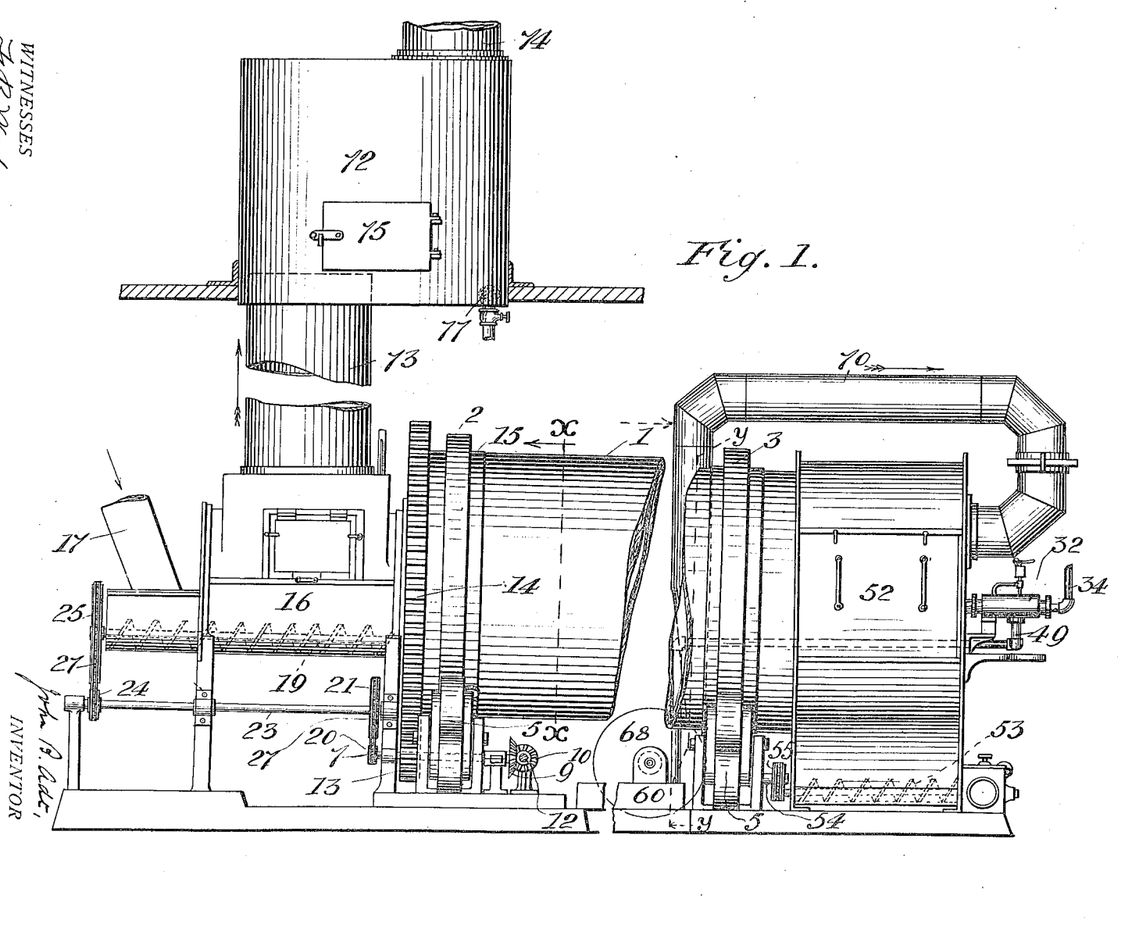
Figure 1 is an exterior side elevation of the improved apparatus except that certain parts thereof have been removed to shorten the figure.
Figure 2:
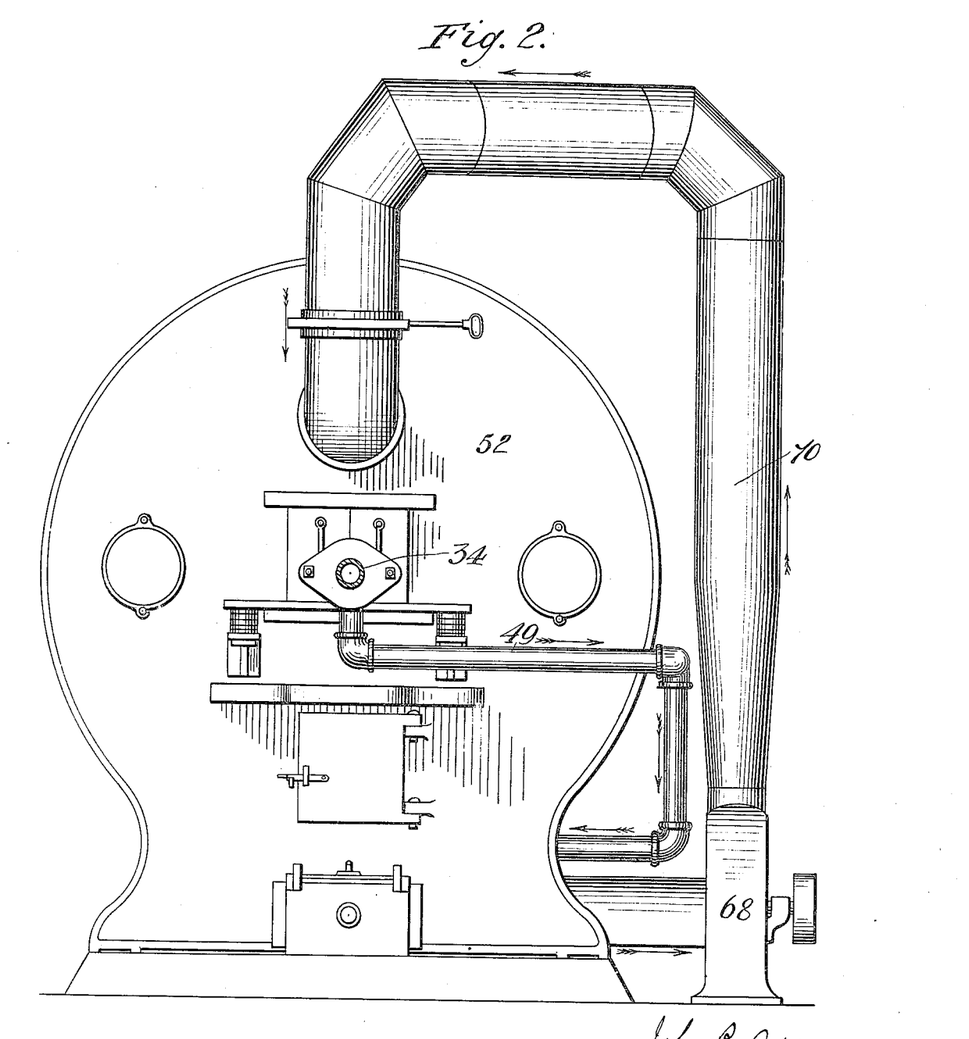
Fig. 2 is an exterior view of the rear or delivery end of the apparatus.

7 is a shaft provided at one end thereof with a beveled gear wheel 9 which is in mesh with a similar pinion 10 on the main driving shaft 12 as best shown in Fig. 1. The shaft 7 is also provided with a spur pinion 13 in mesh with a toothed annulus 14 which is secured to the head 15 of the cylinder and serves as the direct means for rotating the cylinder. The head 15 also carries the band 2 before referred to, and shown in Figs. 1 and 3.

16 is a stationary box or hopper at the entrance or receiving end of the rotary cylinder 1, having a chute 17, into which the material to be dried is introduced; and at the bottom of the said box is a screw conveyer 19 whereby material to be dried is carried from the feed hopper into the rotary cylinder 1.

The conveyer 19 is driven from the shaft 7 by means of the sprocket wheels 20, 21 the secondary shaft 23, the sprocket wheels 24 and 25, the latter being on the conveyer shaft, and the sprocket chains 27. The upper portion of the hopper 16 serves an additional purpose hereinafter described.

Within the rotary cylinder 1, and secured thereto by means of clamps and bolts, are gangs of steam pipe, shown as four in number, and each gang is composed of pipes 29 which extend from the delivery end of the rotary cylinder 1 to near its receiving end; and the pipes 30 which are shorter than the pipes 29, and do not extend as far as the others at the receiving end of the cylinder, for a purpose hereinafter described. This difference in length of the pipes 29 and 30 will be seen by reference to Fig. 3.

Figure 6:
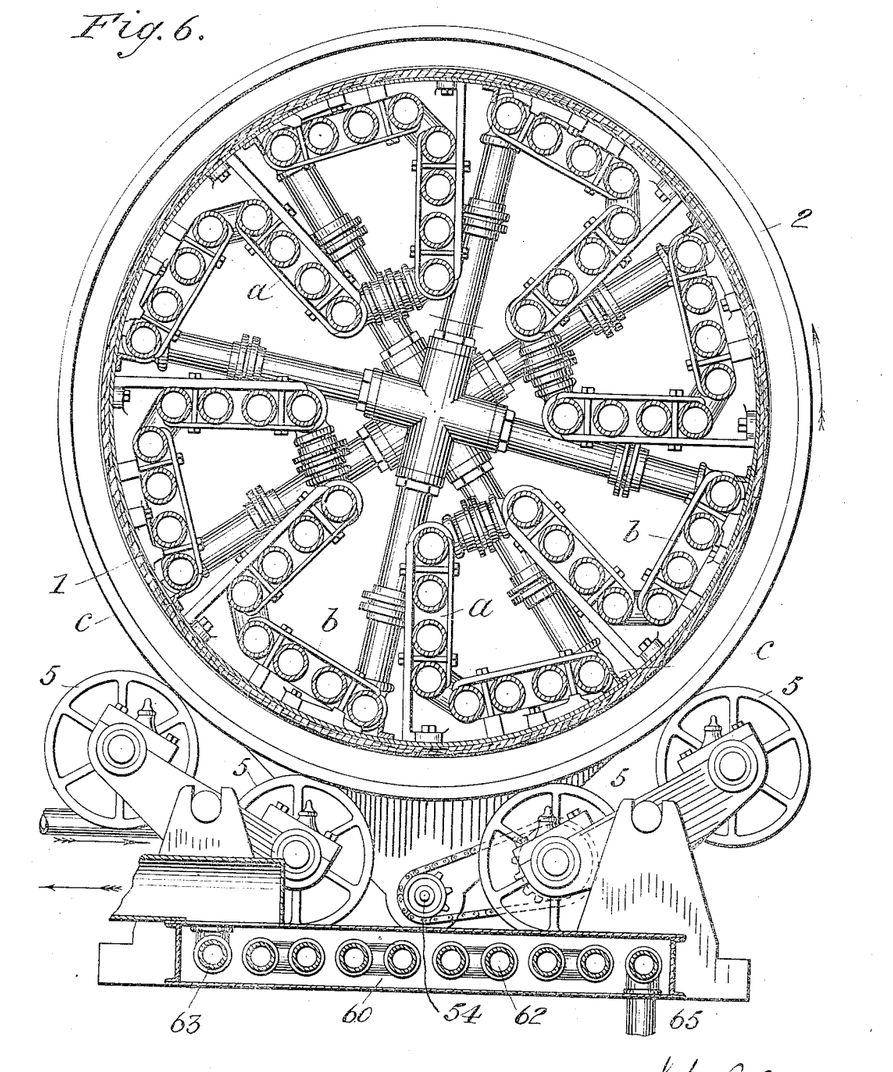
Fig. 6 is a section taken on the broken lines $y$—$y$ in Figs. 1 and 4 and looking in the direction indicated by the dotted arrows in said figures.
Figures 7, 8:
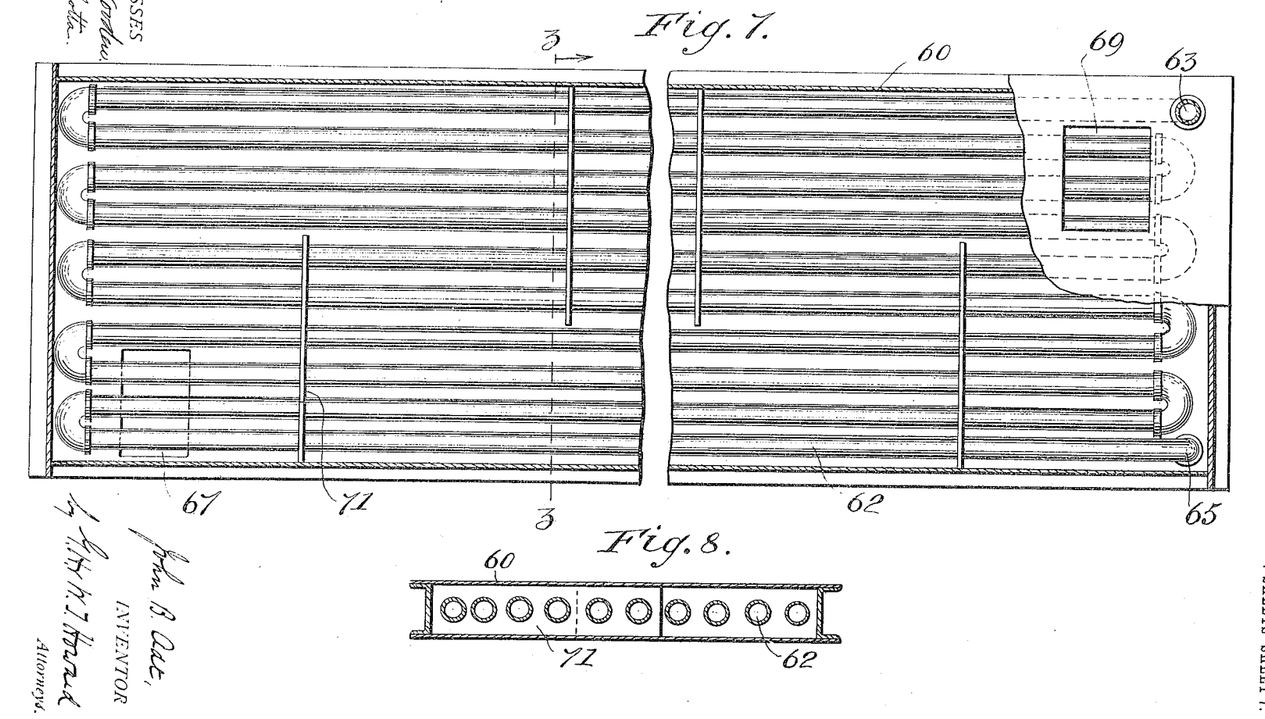
Fig. 7 is a sectional plan of a certain box in which air is heated before coming into contact with the material to be dried.
Fig. 8 a cross section of the same, taken on the broken line $z$—$z$ in Fig. 7.
Figs. 2 to 8 inclusive, are on an enlarged scale.

It will be seen by reference to Fig. 6, that the pipes 29 and 30 forming the gangs, are arranged in two series independently of the difference in their lengths before described. The pipes of the series $a$ are on radial lines, while those forming the series *b* are situated near to the shell of the rotary cylinder and extend transversely in lines which deviate slightly from a right angle with respect to radial lines; and that as the cylinder rotates in a direction indicated by the curved arrows, the material to be dried before it reaches a powder condition, is prevented from passing beneath the first pipe of the series *b* and becoming clogged thereat, by means of the angle iron bars *c* which extend longitudinally of the cylinder.

The remaining pipes of the series *b* gradually increase the distance from the shell, so that any material passing under the pipes, finds a free outlet. This construction of the gangs has been found effective, and is an important part of the invention.

At the rear or delivery end of the rotary cylinder 1 is a fixed cylindrical receptacle 32 which receives the steam which has passed through the gangs of pipe as hereinafter described, having at the rear end, a packing box 33 into the gland of which is screwed the main fixed live steam supply pipe 34.

35 is a second and rotary live steam pipe which is in alinement and forms practically a continuation of the main stationary steam pipe 34. The pipe 35 extends from the packing box 33 into the rotary cylinder 1, and is coupled to a hollow rotary hub 36 having radial branches 37 into which are screwed the pipes 39 to convey steam to the gangs which as before stated, embrace the pipes 29 and 30.

40 is a sleeve which surrounds the pipe 35, and which by having a greater diameter than the said pipe, produces the annular space 42. The sleeve 40 enters the exhaust steam receptacle 32 where it is packed to prevent leakage around it; and it is provided with radial branches 45 with which the steam discharge pipes 47 of the gangs of pipe, are connected; and 49 is a pipe leading from the exhaust steam receptacle 32 to an apparatus hereinafter described, whereby air before entering the rotary cylinder 1 for drying purposes, is heated.

Figure 3:
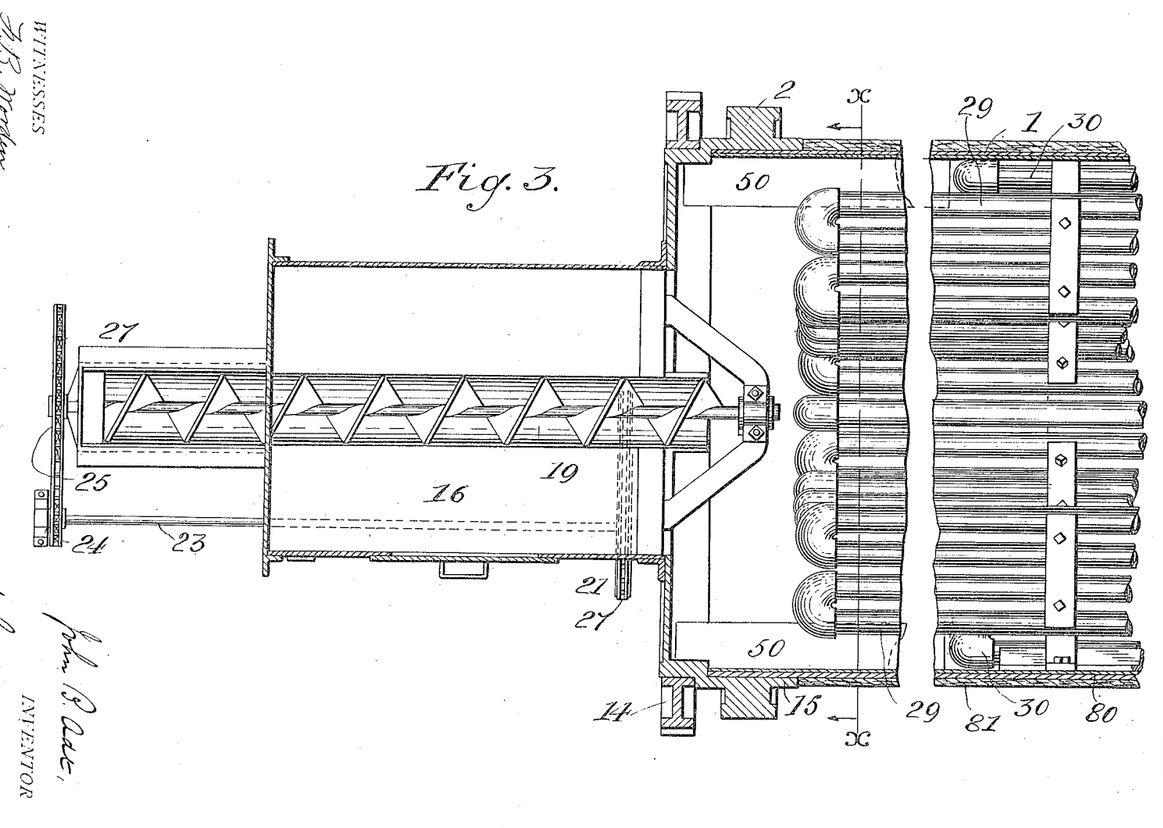
Fig. 3 is a sectional plan of the front or receiving end of the same.

50, 50 are paddles shown only in Figs. 3 and 6, extending radially from the wall of the rotary cylinder 1 to which they are bolted, at the receiving end thereof, which serve to stir the material to be dried upon entering the rotary cylinder.

Figure 4:
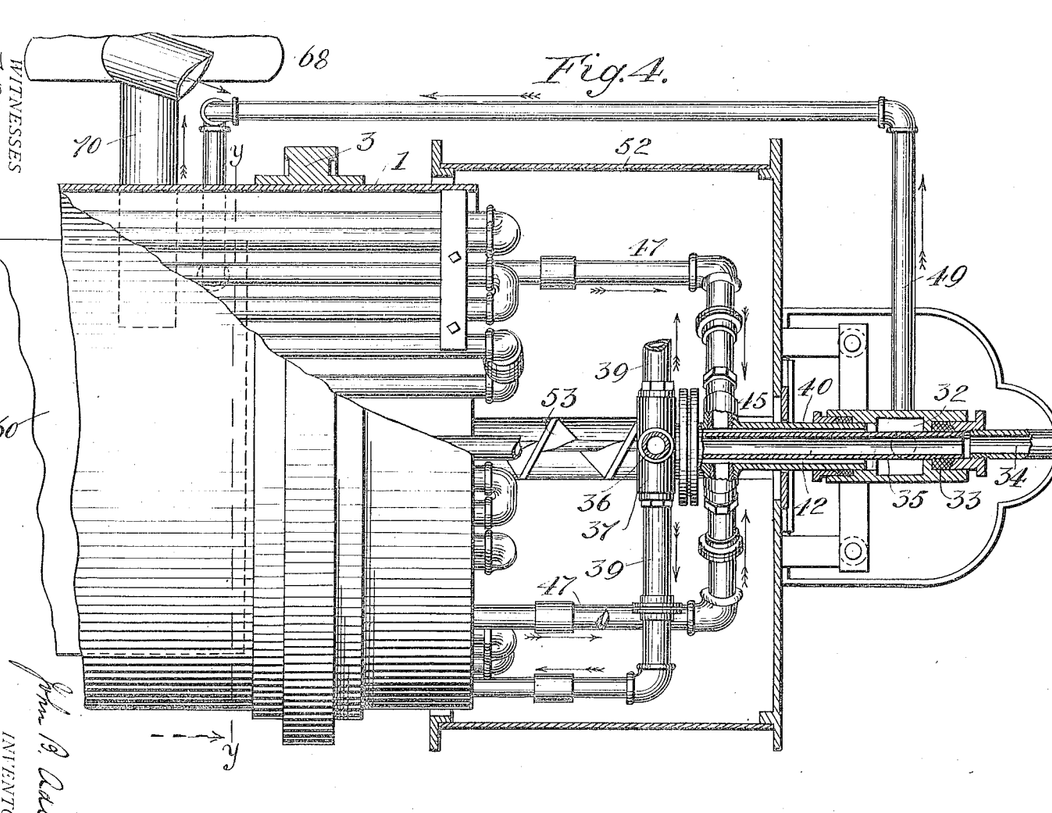
Fig. 4 is a partly sectional plan of the rear or delivery end of the apparatus.

The delivery end of the rotary cylinder 1 enters a fixed air-expansion casing 52 having a larger diameter than the said cylinder, and with the exception of the pipes 39 and 47 and their connection, as shown in dotted lines in Fig. 1 and in full lines in Fig. 4, is unoccupied, and its transverse area is therefore considerably greater than that of the cylinder. This difference in transverse areas of space in the said elements, is essential to the proper and satisfactory operation of the apparatus, as will hereinafter appear.

At the bottom of the casing 52 is a screw conveyer 53 shown only in dotted lines in Fig. 1. It is driven from the shaft 54 of one of the rollers 5 through the medium of the sprocket wheels 55 and 57, and a sprocket chain, as shown in Figs. 1 and 6.

60 is a box (see Figs. 1, 2, 6, 7 and 8) situated underneath the rotary cylinder 1, having therein a gang of pipe 62, one end (63) of which is connected to the exhaust pipe 49, and the other end (65) leading to the atmosphere, through a steam trap not shown.

Atmospheric air enters the box 60 through the opening 67; and over the discharge opening 69, is placed a fan 68 adapted to draw exterior air which has passed over the gang 62 of steam heated pipe, and force it through the pipe 70 to the air-expansion casing 52 and thence to the delivery end of the rotary cylinder 1, as shown best in Fig. 1.

In order to increase the efficiency of the air-heating box 60 the same is provided with the baffle plates 71 which cause the air passing through the box to take a circuitous route.

72 is an air expansion drum in communication by means of the pipe 73, with the hopper 16, at the entrance end of the rotary cylinder 1, having an outlet pipe 74 leading to the exterior air, or if desired, to a stack in which latter case, the draft through the rotary cylinder 1 would be increased.

It will be understood that by the expansion of the exhaust air passing from the pipe 73 to the drum 72 which has an increased transverse area, the rapidity of the current in the drum is reduced, and any particles of the dried material carried upward with the air, will have a tendency to fall by gravity to the bottom of the drum from which they can be taken out through the door 75.

By reference to Fig. 1 it will be seen that the pipe 73 passes some distance into the expansion drum 72. The object of this arrangement is to momentarily retain any water resulting from condensation of vapor carried by the air and which passes off through the strainer 77. It will also be seen that the outlet pipe 74 is placed out of vertical alinement with the pipe 73 in order that drippings from the former will not pass to the latter and thence to the hopper 16, but instead, to the bottom of the drum from which it will escape through the strainer 77 with any other water which may have collected in the drum.

Figure 5:
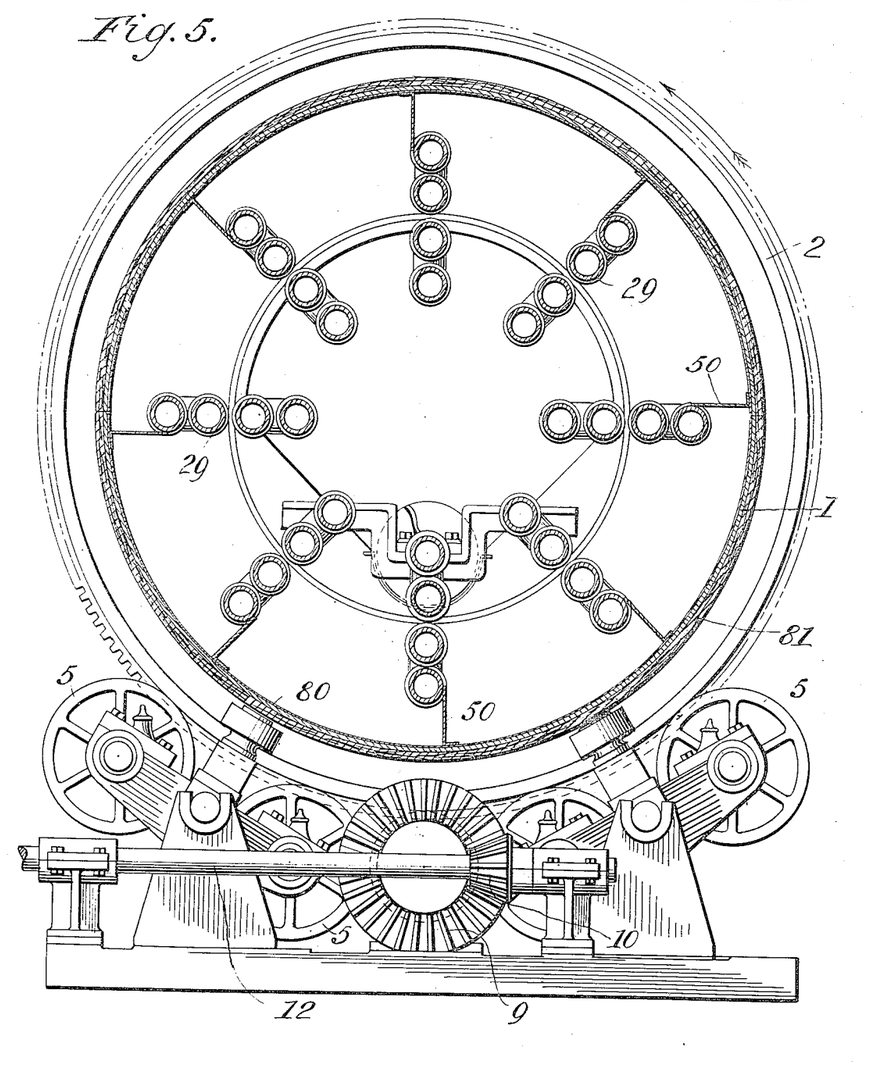
Fig. 5 is a section of parts of Figs. 1 and 3 taken on the broken lines $x$—$x$, and looking in the direction indicated by the arrows in full lines in those figures.

To prevent as far as is possible, corrosion of the inner surface of the wall of the rotary cylinder which is usually made of iron, at its feed or entrance end, by reason of its contact with the material in its wettest condition, that part of the cylinder is lined with sheet copper represented by 80, as shown in Figs. 3, 5 and 6; and to retard radiation of heat, the entire outer surface of the cylinder is clothed with some non-conducting material which is represented by 81 in the said figures.

Grain from breweries and distilleries as used in this apparatus, contains about 60 per cent. water, and when fed by the conveyer into the rotary cylinder is a compact viscuous mass; and should the material in this state come immediately into contact with the heated gangs, the pipes thereof would become coated with a baked covering which would reduce their heat conductivity. It is to obviate this coating of the gang pipes that I employ the paddles 50 which serve to lift the massed material and after carrying it partially around allow it to drop, in which operation it is considerably broken up, and dried sufficiently to prevent its adhering to the gang pipes with which it next comes into contact; and the drying operation continues until the material reaches the delivery end of the apparatus when it is discharged by means of the screw conveyer 53.

Supposing the apparatus to be in operation with the cylinder 1 in rotation, wet grain in a dense mass being fed into the cylinder, live steam to be passing through the gangs in the cylinder and thence to the gang pipe 62 in the air heating box 60 from which it escapes to the outer air, the fan 68 drawing heated air from the box 60 and forcing it through the pipe 70 to the air expansion casing 52 and thence to the discharge end of the rotary cylinder; it will be understood that the wet grain is first stirred by the paddles 50 which serve to break up the material, and in this primary operation, the viscosity of the material is reduced and it is better adapted to be acted upon by the rotating gangs which gradually drive off the moisture, so that by the time it reaches the discharge end of the apparatus it is dry.

As before briefly stated the drying operation is more economically carried out when the heated drying air strikes first the driest portion of the material. To understand this it must be borne in mind that the dense vapor in the cylinder is at the feed end, and this being close to the pipe 73, the action of the air blast is to effect its immediate expulsion, so that the nearer the grain gets to the rear or discharge end of the machine the drier the air is to which it is subjected. In other words the drying operation is further aided by the action of air which is not fully charged with moisture instead of air in which the moisture is nearly at the point of saturation.

It must be understood that a portion of the dried grain leaving the rotary cylinder 1 having been previously ground, is in a state of comminution, and should it meet with a sharp blast of hot air, it would be forced back and held in suspension in the damp air at the entrance end of the cylinder, and would eventually pass to the outer air and be lost. This loss of the finer particles of the material is obviated by interposing between the delivery end of the cylinder, and the discharge end of the hot air pipe 70, the air expansion casing 52 which has a transverse area greater than that of the cylinder, as before stated.

I claim as my invention:—

1. In a drying apparatus, a rotary cylinder having gangs of steam pipe which rotate with the cylinder, and a fixed air-expansion casing in which the delivery end of the cylinder rotates, combined with an air heating box having therein a gang pipe which receives steam from the gangs in the cylinder, and discharges it to the outer air, and a fan arranged to draw air from the said box and force it to the air-expansion casing, and thence to the rotary cylinder, whereby it is brought directly into contact with the material in the cylinder which is driest, and passes thence over the material and escapes at the feed or entrance end of the cylinder, carrying with it the dense vapor arising from the material first heated by the gangs in the cylinder, substantially as specified.

2. In a drying apparatus, a rotary cylinder having gangs of steam pipe which rotate with the cylinder, and an air-expansion casing in which the delivery end of the cylinder rotates, combined with an air heating box having therein a gang pipe which receives steam from the gangs in the cylinder and discharges it to the outer air, a fan arranged to draw air from the said box and force it to the air-expansion casing and thence to the rotary cylinder at the delivery end thereof, whereby it is brought directly into contact with the material in the cylinder which is driest, and passes over the material to the feed or entrance end of the same, an expansion drum which receives the moisture-charged air, and a pipe leading from the expansion drum to the outer air, substantially as specified.

3. In a drying apparatus, a rotary cylinder having gangs of steam pipe of varying lengths therein which rotate in common with the cylinder, combined with means to convey the material to be dried to the said cylinder, and a system of paddles which rotate with the gangs, and which are adapted to first receive the material and break it up before it passes to the rotary gangs, substantially as specified.

4. In a drying apparatus, a rotary cylinder having therein a gang of pipe, the said gang embracing a system of return pipes which are situated near to the shell or wall of the cylinder, the pipe at one end of the system being nearer to the shell than the others, thus producing a gradual increase in the depth of the spaces between the said pipes and the wall of the cylinder as described, substantially as, and for the purpose specified.

5. In a drying apparatus, a rotary cylinder having therein a gang of pipe, the said gang embracing a system of return pipes which are situated near to the shell or wall of the cylinder, the pipe at one end of the system being nearer to the shell than the others, thus producing a gradual increase in the depth of the spaces between the said pipes and the wall of the cylinder as described, and a bar which prevents material from passing under the first pipe of the system, substantially as, and for the purpose specified.

6. In a drying apparatus, a drying cylinder, an air expansion drum, and a pipe leading from the said cylinder to and through the bottom of the drum, to form in the same a receptacle for water, combined with an outlet pipe extending from the upper portion of the drum and out of alinement with the pipe which connects it with the cylinder, and a valved strainer at the bottom of the drum, substantially as specified.

JOHN B. ADT.

Witnesses:
J. H. HUGHES,
ALBERT W. ADT.